United States Patent [19]
Farris

[11] Patent Number: 5,971,494
[45] Date of Patent: Oct. 26, 1999

[54] DUAL USE TRAILER WITH HOPPER BOTTOM

[76] Inventor: Gary C. Farris, 307 W. 8th St., Goodland, Kans. 67735

[21] Appl. No.: 08/882,982

[22] Filed: Jun. 26, 1997

Related U.S. Application Data

[60] Provisional application No. 60/020,894, Jun. 27, 1996.

[51] Int. Cl.⁶ ........................................ B60P 1/04
[52] U.S. Cl. ................................ 298/27; 298/25; 298/24
[58] Field of Search ........................... 296/181; 414/467, 414/539; 298/24, 29, 25, 27, 30

[56] References Cited

U.S. PATENT DOCUMENTS

| | | | |
|---|---|---|---|
| 288,792 | 11/1883 | Goodrich | 298/24 |
| 560,369 | 5/1896 | Bothchild | 298/24 |
| 1,071,029 | 8/1913 | Campbell | 298/24 |
| 1,935,057 | 11/1933 | Natali | 298/24 |
| 2,648,293 | 8/1953 | Dorey | 298/24 |
| 3,087,759 | 4/1963 | Worster | 298/24 |
| 3,692,363 | 9/1972 | Tenebaum et al. | 298/24 |
| 3,738,511 | 6/1973 | Lemon et al. | 298/24 |
| 3,756,469 | 9/1973 | Clark | 298/24 |

OTHER PUBLICATIONS

Jet Company, Inc. 4 page brochure "The #1 Choice Jet Co."
"Jet Co. Electric Roll Tarp" 1 page, 2 sided sheet of information.

*Primary Examiner*—Lanna Mai
*Assistant Examiner*—Andrew J. Fischer
*Attorney, Agent, or Firm*—Reising, Ethington, Barnes, Kisselle, Learman & McCulloch P.C.

[57] ABSTRACT

The hopper bottom trailer has a main frame supported by wheels, a hopper with hopper walls that extend downwardly to a discharge opening and a discharge door, and two side walls. An upper side frame member is attached to each side wall. A front upper frame member and a rear upper frame member are secured to the upper side frame members. A forward inclined floor panel is pivotally attached to the front upper frame member and a rear inclined floor panel is pivotally attached to the rear upper frame member. The forward and rear inclined floor panels are pivoted from an inclined position in which grain can slide down their surfaces to the hopper to a raised position which opens the inside of the trailer to receive elongated cargo.

1 Claim, 3 Drawing Sheets

DUAL USE TRAILER WITH HOPPER BOTTOM

This application claims the benefit of U.S. Provisional Application No. 60/020,894 filed Jun. 27, 1996.

BACKGROUND OF THE INVENTION

1. Technical Field

This invention relates to a trailer with a hopper bottom for transporting bulk material such as grain and more particularly to a hopper bottom trailer that can be converted to transport other cargo.

2. Description of the Prior Art

Trailers with hopper bottoms have a main frame supported by an axle assembly at the rear and supported by an axle assembly at their front end or by a fifth wheel. One or more hoppers are suspended below the main frame in positions spaced from the axle assembly or axle assemblies. Each hopper has one or more walls that extend downward and inward toward each other to a discharge opening. A closure member closes the discharge opening. The closure member can be moved to allow bulk material such as grain to flow through the discharge opening.

Walls are attached to the main frame and extend upwardly. The two side walls extend substantially vertically upward. End walls also extend vertically upward from the main frame. Because the hopper or hoppers have to be spaced to the front or to the rear of axle assemblies. The portions of the trailer floor above the main frame and forward or aft of a hopper must slope upwardly and forward or aft from a hopper or from hoppers. The angle of these portions of the floor must be sufficiently steep to insure that all grain slides down the floor even when the grain does not slide well due to natural stickiness, to moisture content or to contaminants such as weeds. Hopper bottom trailers have all sloping floors so that when the discharge opening or openings are open all the grain will slide out under the force of gravity.

A trailer with floors that slope at a moderately steep angle is only useful for transporting bulk material such as grain. The inability to transport other types of loads such as header attachments for grain harvesting machines may make the use of hopper bottom trailers impractical for some potential users. To move hopper bottom trailers from one grain field to another may require that a special trip be made to move an empty grain trailer and another transport system may be required for moving a header assembly for example. Moving from one grain field to another in such circumstances becomes expensive especially if the grain fields are separated a substantial distance.

SUMMARY OF THE INVENTION

An object of this invention is to provide a dual use trailer with a hopper bottom that can be used to transport bulk material and to transport elongated articles and general freight. Another object of the invention is to provide a dual use trailer with a hopper bottom that can be used to transport grain and a header attachment for a combine harvester.

The trailer has a main frame supported by a rear axle assembly and a front axle assembly or a pin that can be coupled to a fifth wheel on a tractor vehicle. The main frame includes side main frame members, a front main frame member, a rear main frame member and a plurality of cross members. Each cross member is secured to the two side frame members and is parallel to the front and rear frame members. An upper frame is above the main frame and includes two side upper frame members, a front upper frame member and a rear upper frame member. Side panels extend vertically upward from main side frame members to the upper side frame members. A front panel extends vertically upward from the front main frame to the front upper frame member. A rear panel extends vertically downward a short distance from the rear upper frame member leaving most of the rear open.

A hopper is suspended from the main side frame members and at least two of the cross members in the center of the trailer. Additional cross members extend across the top of the hopper. Hopper walls extend downward from the main frame to a discharge opening. A discharge door or doors close the opening.

The inclined floor of the trailer forward of the hopper extends upwardly and forward from the hopper to the front panel. The inclined floor of the trailer to the rear of the hopper extends upwardly and to the rear from the hopper to rear panel extending downward from the rear upper frame members.

Lips on both sides of the inclined floor members have downwardly extending portions that extend into a channel member secured to the side panel on each side of the trailer. These lips engage the channel members to form a grain tight seal.

The upper edge of the forward inclined floor is pivotally attached to the front panel. The lower edge of the forward floor is in contact with the forward edge of the hopper and is supported by a cross member of the main frame. The upper edge of the rear inclined floor of the trailer is pivotally attached to the rear panel. The lower edge of the rear floor is in contact with the rear edge of the hopper and is supported by a cross member of the main frame.

A cable of a take up spool is attached to the lower edge of the forward inclined floor and extends upward to a support pulley and forward to the front panel. The take-up spool is mounted on the front panel. The take up spool is rotated to lift the lower edge of the forward floor to a horizontal position. A cable of a second take up spool is attached to the lower edge of the rear inclined floor and extends upward to a support pulley and forward to the front panel. The second take up spool is mounted on the front panel. Rotation of the second take up spool lifts the lower edge of the rear floor to a horizontal position.

Lifting the forward floor and the rear inclined floors provides an open cargo space that extends from the cross members up to the bottom of the short rear panel, from one side panel to the other side panel and rearward from the front panel. If required a horizontal floor can be attached to the tops of the cross members under the inclined rear floor and forward floor. Elongated cargo could bridge across the open top of the hopper. The horizontal floor sections need not be solid and could in fact be narrow rail members designed to support specific cargo. Rail members of floor sections that bridge across the top of the hopper can also be provided if needed.

BRIEF DESCRIPTION OF THE DRAWINGS

The presently preferred embodiment of the invention is disclosed in the following description and in the accompanying drawings, wherein.

DETAILED DESCRIPTION OF THE PREFERRED EMBODIMENTS

Figure 1:
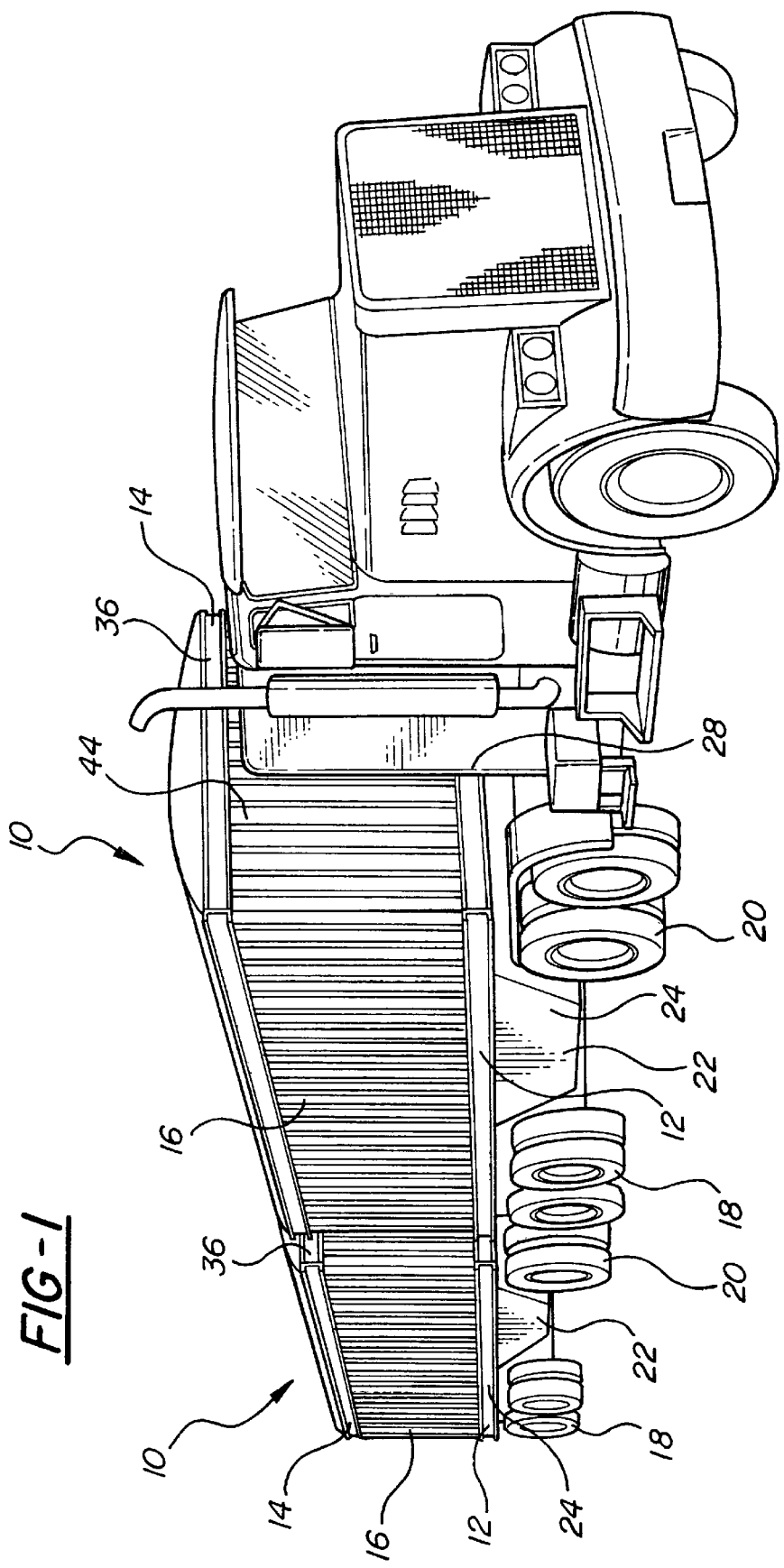
FIG. 1 is a perspective view of two hopper bottom trailers.
Figure 2:
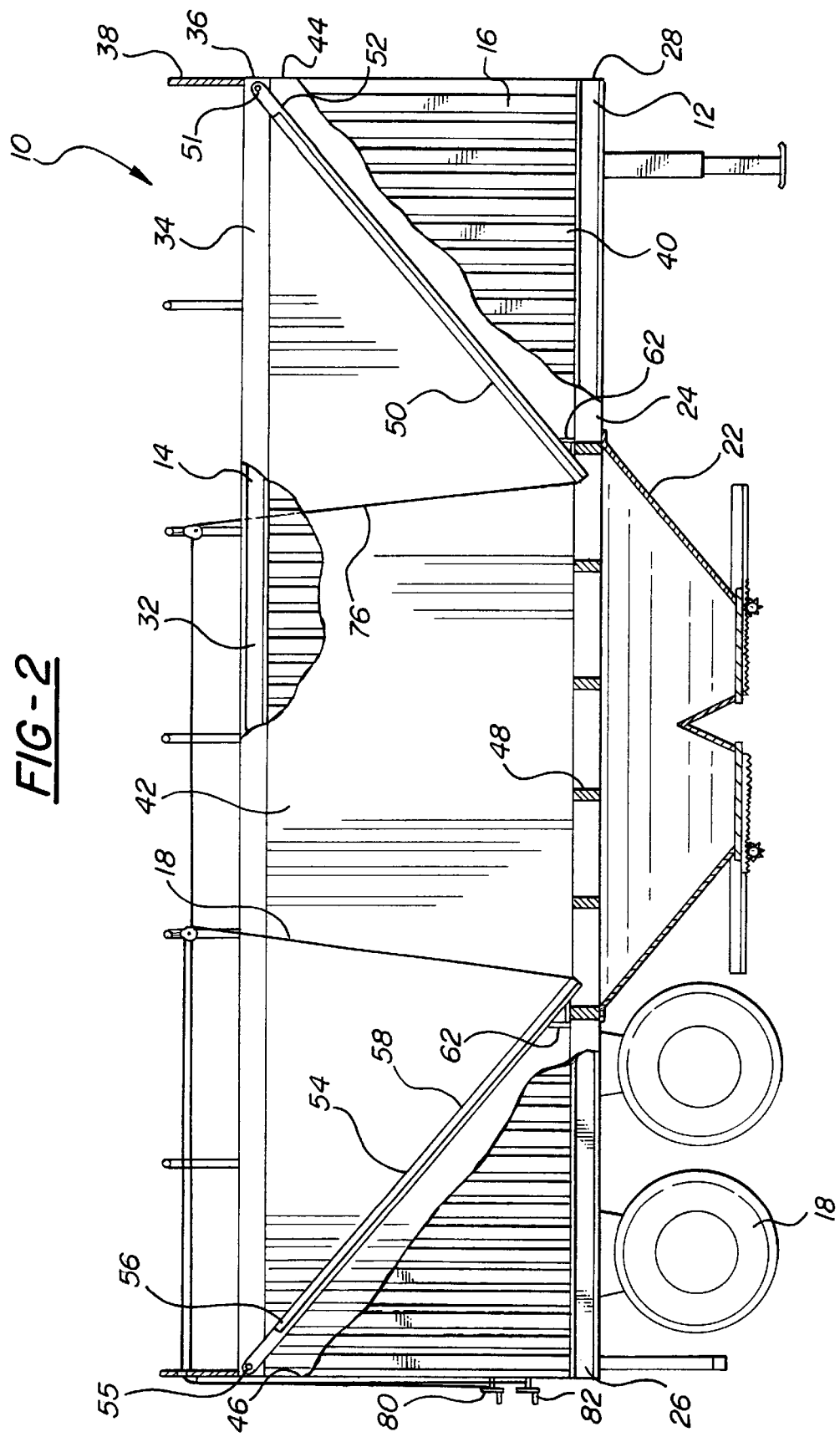
FIG. 2 is a side elevational view of one of the trailers with parts broken away to show the hopper and both inclined floor panels.
Figure 3:
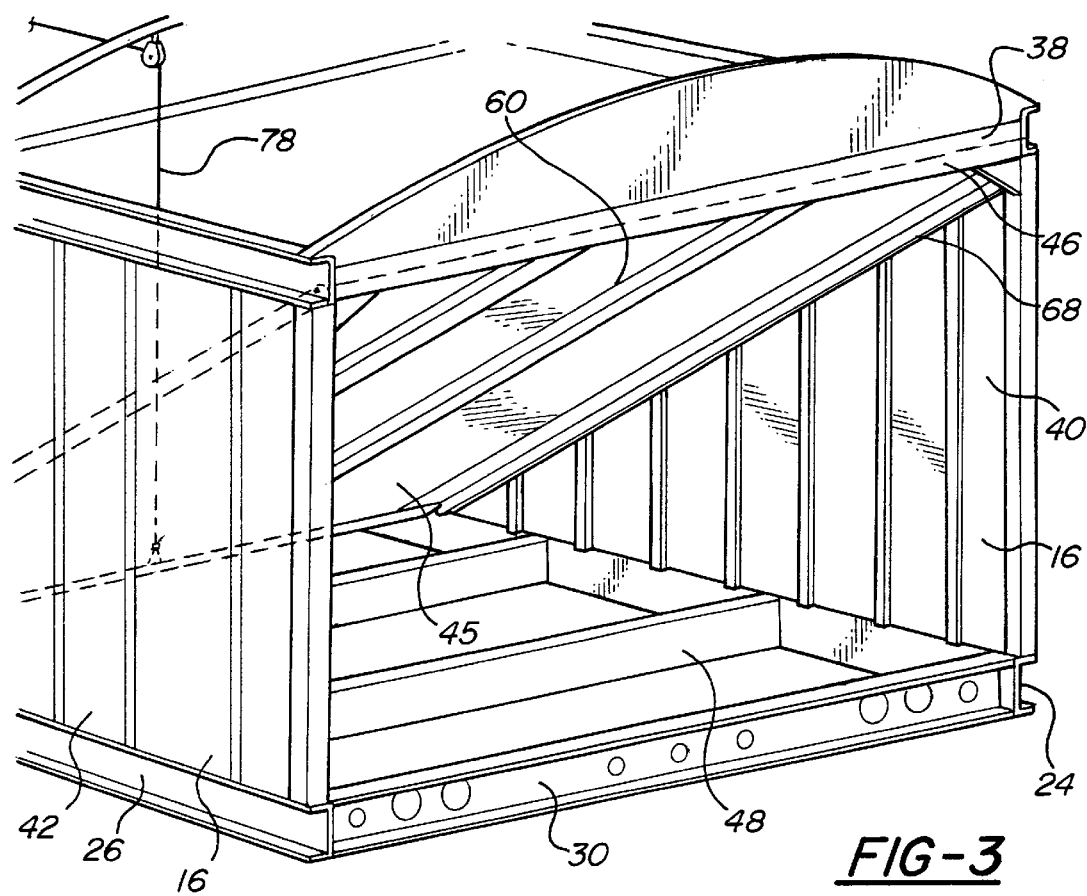
FIG. 3 is a perspective view of the rear of the trailer with the rear inclined floor lowered and the rear wheel and axle assembly omitted and FIG. 4 is an enlarged sectional view of the seal between an inclined floor and a side panel.
Figure 4:
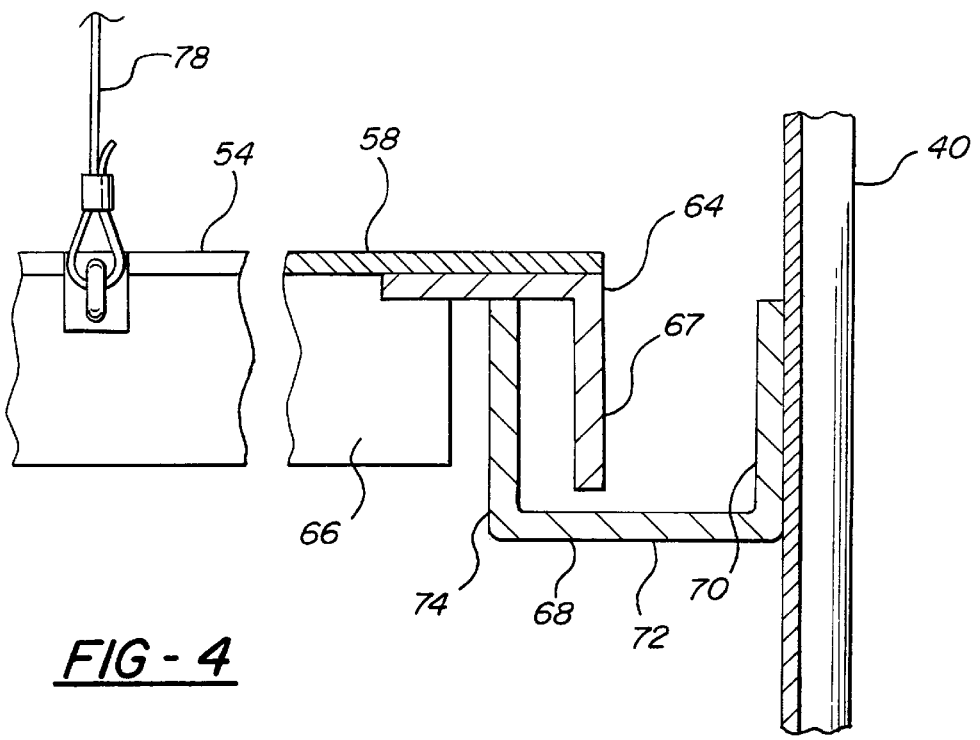

The hopper bottom trailers 10, shown in FIG. 1 has a main frame 12 and an upper frame 14. The main frame 12 and the upper frame 14 are connected together by panels 16. The main frame 12 is supported by a rear wheel and axle assembly 18 and a front wheel and axle assembly 20. A hoper assembly 22 extends down below the main frame 12 between the front and rear wheel and axle assemblies 18 and 20.

The main frame 12 has a right main side frame 24 and a left main side frame 26. A front main frame member 28 and a rear main frame member 30 are welded to the side frames 24 and 26. The upper frame 14 has a right side upper frame member 32 and a left side upper frame member 34. A front upper frame member 36 and a rear upper frame member 38 are welded to the side upper frame members 32 and 34. The main frame members 24, 26, 28, and 30 and the upper frame members 32, 34, 36 and 38 are channel members. The side panels 16, which are welded to the main frame 12 and the upper frame 14, are metal sheets with corrugations. These panels include a right side panel 40 a left side panel 42, a front panel 44 and a rear panel 46. The rear panel 46 only extends downward from the rear upper frame member 38 a few inches and is made from structural members without corrugations.

A plurality of cross members 48 are attached to side main frame members 24 and 26. The hopper assembly 22 is attached to two of the cross members 48 and to the main side frames 24 and 26. The hopper assembly 22 has walls that extend downwardly and inwardly to a discharge opening or openings. A discharge opening closure door closes the discharge opening and can be moved to allow bulk material, such as grain, to run out of the trailer 10. Some cross members 48 extend across the open top of the hopper assembly 22.

A forward inclined floor 50 of the trailer 10 extends from the front of the hopper assembly 22 to an upper portion of the front panel 44. A hinge 51 connects the upper edge 52 of the floor 50 to an upper position of the front panel 44. A rear inclined floor 54 extends from the rear of the hopper assembly 22 to the upper portion of the rear panel 46. A hinge 55 connects the upper edge 56 of the rear floor 54 to the rear panel 46.

Both inclined floors 50 and 54 are essentially identical. Only one is therefore described in detail. The rear inclined floor 54 has a smooth metal sheet upper surface 58 reinforced on the lower side by I-beams 60. A plate 62 on the lower edge of the floor 54 is connected to the I-beams 60 and sits on a cross member 48 when transporting grain. An angle member 64 is attached to each side of the floor 54 by tubes 66. The outer flange 67 of the angle member 64 extends vertically downward.

Structural members 68 are attached to the side panels 40 and 42 to seal between the side panels and the inclined floor 54. The structural member 68 has a vertical flange 70 that is secured to the side panels 40 or 42, a transverse center plate 72 and a vertical flange 74. The outer flange 67 on the inclined floor 54 extends down between the flange 74 of the structural member 68 and the side panel 40 or 42 to create a grain tight seal. The transverse center plate 72 is relative wide. When the inclined floor 54 is lowered, the channel between the side wall 40 or 42 and the outer flange 67 creates a passage for grain movement that promotes grain flow and limits bridging.

Cables 76 and 78 are connected to the lower edges of the inclined floors 50 and 54, extend upward to a pulley and then forward and through the front upper frame member 38. The cables 76 and 78 are attached to manually rotated spool assemblies 80 and 82. The spool assemblies 80 and 82 can be rotated to raise and lower the inclined floors 50 and 54.

With the inclined floors 50 and 54 raised, the cross members 48 define a substantially horizontal support surface that can be used to support cargo inserted through the rear opening The cross members under the inclined floors 50 and 54 can be covered with a cargo support deck or with special cargo support rails if required. A cover or other suitable structure can also be provided to cover the top of the hopper assembly 22 when required.

While preferred embodiments of the invention have been shown and described, other embodiments will now become apparent to those skilled in the art. Accordingly the invention is not limited to that which is shown and described but by the following claims.

I claim:

1. A dual use trailer with a hopper bottom comprising a main frame with a right main side frame member, a left main side frame member, a rear main frame member connected to the right main side frame member and the left main side frame member, a front frame member connected to the right main side frame member and the left main side frame member, and a plurality of transverse main frame cross members attached to the left main side frame member and the right main side frame member; a rear wheel and axle assembly connected to and supporting a rear portion of the main frame; a front wheel and axle assembly supporting a front portion of the main frame; a hopper assembly attached to at least two main frame cross members and having walls that extend downwardly and inwardly to at least one discharge opening and a closure door closing the at least one discharge opening; an upper frame with a right side upper frame member, a left side upper frame member, a front upper frame member connected to the right side upper frame member and the left side upper frame member, a rear upper frame member connected to the right side upper frame member and the left side upper frame member; a left side panel connected to the left main side frame member and the left side upper frame member; a right side panel connected to the right main side frame member and the right side upper frame member; a forward inclined floor panel with an upper edge pivotally attached adjacent to the front upper frame member, a lower edge that sits on the main frame when the forward inclined floor panel is in a lowered position, a seal between the left edge of the forward inclined floor panel and the left side panel when the forward inclined floor panel is in a lowered position, and a seal between the right edge of the forward inclined floor panel and the right side panel when the forward inclined floor panel is in a lowered position; a rear inclined floor panel with an upper edge pivotally attached adjacent to the rear upper frame member, a lower edge that sits on the main frame when the rear inclined floor panel is in a lowered position, a seal between the left edge of the rear inclined floor panel and the left side panel when the rear inclined floor panel is in a lowered position and a seal between the right edge of the rear inclined floor panel and the right side panel when the rear inclined floor panel is in a lowered position; and wherein the front inclined floor panel and the rear inclined floor panel can be pivoted into generally horizontal positions spaced above the main frame.

* * * * *